April 2, 1968 S. L. LEACH 3,376,453
ELECTROLUMINESCENT DEVICES WITH LIGHT EMISSION GENERALLY
PERPENDICULAR TO THE IONIC CURRENT FLOW
Filed Dec. 23, 1966 3 Sheets-Sheet 1

INVENTOR
Sam L. Leach
BY Jacobi & Davidson
ATTORNEYS

INVENTOR,
Sam L. Leach
BY Jacobi & Davidson
ATTORNEYS

United States Patent Office 3,376,453
Patented Apr. 2, 1968

3,376,453
ELECTROLUMINESCENT DEVICES WITH LIGHT EMISSION GENERALLY PERPENDICULAR TO THE IONIC CURRENT FLOW
Sam L. Leach, 32653 Seagate Drive, Palos Verdes Peninsula, Calif. 90274
Continuation-in-part of application Ser. No. 442,436, Mar. 24, 1965. This application Dec. 23, 1966, Ser. No. 604,330
31 Claims. (Cl. 313—108)

ABSTRACT OF THE DISCLOSURE

Electroluminescent devices wherein the light emanates from the device in a direction generally perpendicular to the ionic current flow of the applied electric field, rather than parallel thereto. Various embodiments include, e.g., edge electrodes or split rear electrodes. With such devices it is not necessary for light to pass through a front electrode layer before emanating from the device. In certain embodiments the electroluminescent phosphor particles are protected against environmental humidity by encapsulation in a moisture-proof and vapor-proof coating of very minor thickness.

This application is a continuation-in-part of my copending application Ser. No. 442,436 filed Mar. 24, 1965, which in turn is a continuation-in-part of copending applications Ser. Nos. 306,881, filed Sept. 5, 1963, now abandoned and 354,513, filed Mar. 23, 1964, now abandoned.

This invention relates to electroluminescent devices, and is particularly concerned with the provision of such a device (1) wherein the light emanates from the device in a direction generally perpendicular to the ionic current flow of the applied electric field, rather than parallel thereto; (2) wherein the light need not pass through a front electrode layer in emanating from the device; (3) wherein the electroluminescent phosphor particles of the device are not sensitive to environmental humidity; and (4) wherein the device is of substantially greater efficiency and increased useful life than electroluminescent devices known heretofore.

There have been various prior suggestions with respect to the construction of an electroluminescent device—i.e., a device which produces a light output from electrically excited phosphor particles. With each of the prior suggestions, as with the device disclosed in my application entitled, "Electroluminescent Devices and Methods of Making the Same," Ser. No. 354,512, filed Mar. 23, 1964, now abandoned, a plurality of different layers are superimposed on one another in stacked relation, whereby when an alternating electric field is established between two of such layers which are conductive thereby defining electrodes, phosphor particles incorporated in one or more of the other layers produce a light output, the light emanating from the device in a direction generally parallel to the ionic flow of the electrical field applied thereto.

With each of the prior suggestions, one of the conductive layers, commonly referred to as the "front electrode layer" is at least translucent, and preferably transparent, in order to permit the light passing from the phosphor particles to escape from the device. Specifically, with the prior type units, the electroluminescent phosphor particles are disposed between a pair of such layer electrodes, one of which electrodes is located between the phosphor particles and the front face of the device. Thus, in order for the light emitted by the phosphor particles to travel from the device, it must pass through one of the electrode layers.

Since the characteristics of electrical conductivity and transparency are generally incompatible in one material, the front electrode layer in any of the prior devices necessarily has limited current capacity so that it can meet the translucency requirements for such layer. Limiting the current capacity in turn limits the light output, and consequently the prior "layered" type devices can, at best, yield only a limited quantity of light for any given exposed area.

In addition to the inherent disadvantages pointed out hereinbefore of electroluminescent devices having phosphor particles intermediate front and rear electrode layers, it has now been discovered that this prior art arrangement is the cause of an even more significant obstacle to the provision of a highly efficient light producing source from an electroluminescent device. A phenomenon which has been recognized in prior art constructions of this type is that the light emanating therefrom appears to take the form of a plurality of minute points, one or more from each electroluminescent phosphor particles. These points, of course, are confined to only an extremely small percentage of the total surface area available from each phosphor particle thereby resulting in a grossly inefficient device. A close scrutiny of such prior art devices when they are initially utilized will reveal that, at least at first, the light sources are in the form of elongated lines as opposed to the points available after minimal subjection of the device to an applied electrical field, the ionic current flow of which extends in a direction generally parallel to the direction from which the light emanates during usage.

These lines of light in actuality exist in the naturally occurring cleavage lines which are within the individual phosphor particles and generally extend along the major dimension of the phosphor grain. It will be understood that individual particulates of phosphor are generally non-uniform in shape as will be readily seen from the drawings and description of the instant invention hereinafter. The ionic flow or current path from the electric field impressed across the electroluminescent device tends to follow these lines of cleavage. In effect, what has been determined is that the individual phosphor particles are rotated within their layer by this ionic flow to orient or align the same parallel to the electric field thereby presenting merely the ends of each of the lines of light initially available as a light source, these ends defining the points seen after some use of the device. Thus, it is evident that the efficiency of the construction is reduced substantially by eliminating a major source of light in a relatively short time. However, according to a basic feature of the instant inventive concept, it has been found that if the applied electric field extends in a direction generally perpendicular to the direction from which the light will emanate, rather than parallel thereto, not only is the efficiency of the device not reduced by initial use, but the quantity of light produced by the device will actually increase with time during the orientation period. This improvement will be readily understood if it is recognized that the phosphor particles are originally randomly disposed in their layer so that not all of the lines of light are initially oriented to present the same to the front face of the device. Certain of the phosphor particles in the device as manufactured have only the ends of the lines of light or a portion of the lines of light available as light sources. On use of a device constructed according to the instant inventive concept, the applied electric field is found to align substantially all of the phosphor particles so that their lines of light are properly oriented for maximum efficiency.

Moreover, with certain types of "layered" arrangements, there are various inherent limitations on production techniques and on fields of use. With respect to production, it is necessary with prior art devices to carefully control the layers as to content and thickness, and as to the bonding therebetween. In the use of such "layered" devices, it is necessary to first make the device or the sheet stock for forming the device, and to then place such sheet stock on the particular supporting structure therefor. Therefore, according to one embodiment of this invention the electroluminescent body is integrally formed as opposed to a "layered" construction. Even in other embodiments of this invention, the care necessary in the manufacture of prior art devices is obviated.

The above discussion is exemplary, and is not intended to present each feature of the prior type devices which results in some disadvantage or limitation on operating characteristics. Instead, such discussion is merely presented to indicate the types of general problems which are faced both in the production and in the use of prior art electroluminescent devices.

Aside from the production and use aspects pertinent to electroluminescent devices known heretofore, there are certain technical limitations of importance. Specifically, for essentially all of the important operating layers, a compromise must be reached for the ingredients therein. In the front electrode layer, as indicated above, there is a compromise between translucency requirements and electrical conductivity. In the front dielectric layer, there is a compromise between optimum dielectric qualities and translucency requirements. With respect to the phosphor particle content of the device, there is a further compromise. With an increase in the amount of phosphor particles present, there is necessarily an increase in the amount of dielectric material which must be used. With an increase in the amount of dielectric material which must be used, there is an attendant decrease in the effectiveness of the applied electrical field. Thus, with the prior devices, the phosphor content must be balanced against the requisite amount of dielectric material in order to reach a compromise proportional content which gives the best light output for relative amounts of dielectric material and phosphor particles. The last mentioned compromise is not subject to compensation, as for example by distribution of the applied electrical field, because any field distributing ingredient would tend to provide either short circuits and/or leakage paths due to the close proximity of the front and rear electrodes in a "layered" electroluminescent device.

The present invention is directed toward providing various embodiments of an electroluminescent device which are not subject to the limitations on production and use, or the harsh compromise requirements, which must be met for prior electroluminescent devices. In particular, it is the primary object of the present invention to provide an electroluminescent device which provides for maximum efficient light output with substantially extended useful life, while simultaneously overcoming certain manufacturing difficulties and attendant deleterious effects on the resultant product common with many prior art fabricating techniques.

Basically, one major improvement over electroluminescent devices known heretofore is realized by applying the electrical field in a direction generally perpendicular to the direction from which the light emanates as pointed out hereinabove. This effect can be realized by providing a construction wherein a split electrode is utilized to the rear of the layer incorporating the electroluminescent phosphor particles. This split electrode may extend generally parallel to the layer of phosphor particles but, due to its split nature, the ionic flow caused thereby passes from one portion of the electrode into and through the phosphor layer in a direction generally parallel to the phosphor layer and then back into the other portion of the electrode whereby the phosphor particles are oriented in order that their light lines are presented to the front face of the device. An alternate form of the device can be provided wherein the electrodes are disposed at the edges of an integral electroluminescent body rather than parallel to the exposed face of the same. While this arrangement will result in an electrical field passing in the desired direction, there are certain attendant manufacturing difficulties requiring careful balance between the quantities of the constituents of the device not encountered in using the preferred split electrode construction.

Electroluminescent devices having split electrodes or coplanar spaced electrodes have been suggested heretofore, but with prior art devices it has been necessary to provide extremely complex electrode arrangements in order to insure that the electrodes are closely spaced with respect to each other over their entire expanse. Generally such electrodes have, of necessity, been less than a few thousandths of an inch apart at all points, at least below 0.020 inch because the ionic current would not flow over a greater distance. However, with the embodiments of this invention wherein electrically conductive material is incorporated into the phosphor-containing layer much greater distances can be permitted with highly efficient results. Electroluminescent devices of 48 or 54 inches or greater are possible utilizing the concepts of this invention.

While one basic disadvantage of prior art electroluminescent devices has been the undesirable orientation of the phosphor particles caused by the front and rear electrode layer construction, an additional important consideration, particularly with respect to providing the device with a long life, is its ability to provide continued efficiency in the presence of a relatively high humidity environment. Electroluminescent devices commercially available are particularly sensitive to moisture, their efficiency and useable life decreasing substantially in what must be considered as an undesirably short time. Various attempts have been made heretofore to protect the electroluminescent phosphor particles from environmental moisture and vapor, but no previous suggestions have been particularly significant in realizing this desideration. Generally, the entire device must be shielded by a moisture-proof and vapor-proof layer, but it will be readily seen that, in addition to raising the manufacturing costs of such devices, this procedure necessitates an additional layer to be positioned in front of the light source thereby further reducing the efficiency of the construction.

One suggested method of reducing the sensitivity of the phosphor particles to moisture included coating the same with a layer of glass. While this procedure would appear to have certain advantages, the technique utilized in providing the glass coating according to the prior art teachings, in and of itself effected substantial damage to the phosphor particles which are relatively easily bruised thereby destroying the usefulness of a substantial portion of the phosphor particles. It has now been discovered that if the particles are treated in a particular manner they can be coated with a glass layer with no decrease in the number of useful phosphor particles resulting from the treatment. This procedure produces phosphor particles having a substantially monomolecular glass coating which renders the particles insenitive to any undesirable effect from environmental moisture or vapor. Details of this process will be found in the aforementioned parent application Ser. No. 442,436.

Thus, it is another important object of this invention to provide phosphor particles protected by a layer of glass in a manner so as to obviate the necessity for extraneous moisture-proof and vapor-proof sealing barriers around the entire electroluminescent device. Further, it has been found possible, as explained in detail in parent application Ser. No. 442,436, to add to the glass coating a partial or discontinuous coating of an electrically conductive material whereby the phosphor containing layer will also function as a conductive means ionically interconnecting the spaced electrodes whether they be two portions of a split rear electrode layer or two edge electrodes as described hereinafter.

The glass coated, partially conductively coated, phosphor particles formed in this manner may be mixed with a suitable dielectric material to form either an intergral electroluminescent body to which edge electrodes are applied according to one embodiment of this invention, or to form one layer of an electroluminescent device having a dielectric layer interposed between the above phosphor-containing material and a split electrode layer according to a preferred embodiment of the instant inventive concept. Whichever construction is utilized, it is not necessary when these partially coated, glass coated phosphor particles are utilized, to include in the phosphor-containing layer any additional conductive particles.

It is important to note that an electroluminescent device prepared according to the teachings of the instant invention has an extremely small impedance on the order of 50 ohms per square as compared to the impedance of prior art electroluminescent devices which run as high as 400,000 ohms per square. This extremely high value for prior art constructions produces great heat which destroys the effectiveness of the phosphor particles in a relatively short time. Thus, it is necessary to manufacture prior devices of extremely small widths, generally not in excess of a couple of inches. On the other hand, as explained hereinabove, the electroluminescent devices of this invention can be, and have been, manufactured in widths up to 4 feet and more without encountering the great loss of brillance or light output common in electroluminescent devices known heretofore.

Yet another feature of this invention, is the provision of an electroluminescent body having edge electrodes with a conductive layer on the rear of the phosphor-containing layer to spread the voltage over the entire device and avoid any non-uniformity in output resulting from non-uniformity in the heterogeneity of the mixture of phosphor particles, electrically conductive material and dielectric.

Consistent with the above general objects of the present invention, there are certain specific objects hereof. These specific objects include:

(a) The provision of an electroluminescent device which needs no moisture-proof or vapor-proof sealing barrier if a preferred form of the coated phosphor particles is utilized;

(b) The provision of such a device wherein the electroluminescent body portion thereof can, if desired, be covered on its front and rear faces by an electrically insulating moisture-proof and vapor-proof translucent and preferably transparent material if the preferred form of protected phosphor particles is not used thereby sealing the body from the external atmosphere and preventing moisture and vapor deterioration from occurring therein;

(c) The provision of undamaged, protectively coated electroluminescent phosphor particles which have a substantially monomolecular glass layer thereon resistant to moisture and vapor passage and which are especially efficient when used in an electroluminescent device;

(d) The provision of a modification of the phosphor particles of (c) wherein the glass coated phosphor particles are additionally provided with a discontinuous partial coating of an electrically conductive material; and (e) The provision of an electroluminescent device having a specific combination of specially treated phosphor particles with optimum dielectric material, electrically conductive material and insulating layers.

Additionally, according to one of the modifications of the instant invention there are certain further specific objects which include:

(a) The provision of an electroluminescent device wherein the electroluminescent body portion can easily be formed by so-called "plastic casting" and extruding techniques so as to be available at minimum cost for widespread commercial use;

(b) The provision of such an electroluminescent device wherein, as an alternative to (a), the body portion can easily be sprayed on a supporting surface, and then readily connected to a power source by strip electrodes, whereby, for example, the electroluminescent device can easily comprise a wall, a ceiling, a panel or the like;

(c) The provision of such an electroluminescent device wherein the electroluminescent body portion contains a mixture of dielectric material, phosphor particles, and electrically conductive material, which mixture yields maximum light output through the use of a maximum number of electroluminescent phosphor particles and the distribution of an applied electrical field within the electroluminescent body so as to minimize the requirement for phosphor-dielectric compromise;

(d) The provision of such an electroluminescent device wherein translucency and transparency of the electrodes is not a requirement, and instead, the electrodes can be formed of a suitable highly conductive metal even if light is emitted in two directions;

(e) The provision of such an electroluminescent device wherein the electrically conductive material thereof according to one form of the same, itself possesses electroluminescent characteristics whereby such material augments the total light output of the ultimate device constructed in accordance herewith; and (f) The provision of such an electroluminescent device which will yield trouble-free operation with continued use over substantial periods of time.

In addition to the above specific objectives, there remains a further objective for use particularly with reference to the one embodiment of the device which is the provision of an improved electrode structure adapted to be easily coupled to such a device. More specifically, it is an object of the invention to provide a pronged electrode clip-type structure which can be clamped to the end of an electroluminescent device provided in accordance herewith to serve as an electrode therefore, and which readily accommodates a sealing covering therefore so as to permit the effective closing of the device to damaging external moisture and vapor intrusions, if such be necessary.

The invention will be better understood, and objects other than those set forth above will become apparent, when consideration is given to the following detailed description. Such description makes reference to the annexed drawings presenting preferred and illustrative embodiments of this invention.

In the drawings.

Like reference characters refer to like parts throughout the several views of the drawings.

Figure 1:
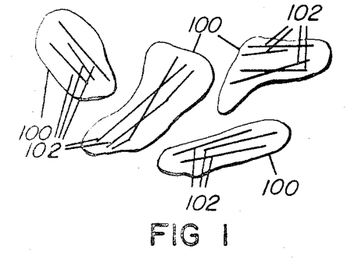
FIGURE 1 illustrates an enlarged view of a plurality of phosphor grains or particulates showing the "lines of light" as they are evidenced in the electroluminescent device according to this invention after ionic current flow stress orientation.
Figure 2:
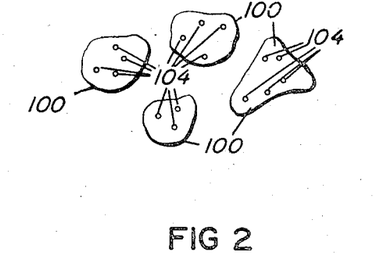
FIGURE 2 shows an enlarged view of phosphor particulates showing the "points of light" which are, in effect, the ends of the "lines of light" as evidenced in prior art electroluminescent devices after current orientation.

Referring now to the drawings and particularly to FIGURES 1 and 2, it will be seen that phosphor grains or particulates designated generally by the reference numeral 100 are ordinarily of a non-uniform shape, basically one longitudinal direction of maximum dimension. As will be evidenced particularly in FIGURE 1 there are naturally occurring lines of cleavage within each of the particles which tend to generally follow the maximum longitudinal dimension of the same. It is these lines of cleavage which form the path for the ionic current flow when an electric field is impressed across an electroluminescent device including such phosphor grains. The lines of light referred to in the introduction hereof are illustratively seen at 102 in FIGURE 1 and may be compared with the points of light designated by the reference numerals 104 in FIGURE 2, the phosphor particles of FIGURE 2 having been oriented in the manner of a prior art type electroluminescent device and the phosphor particles in FIGURE 1 having been oriented in the manner of an electroluminescent device according to this invention, each as will now be more fully explained.

Figure 3:
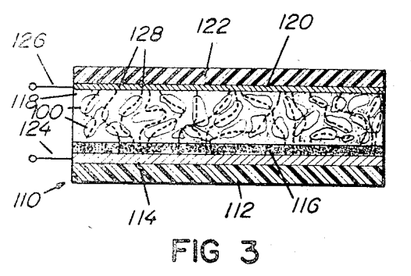
FIGURE 3 is an enlarged detailed cross-sectional view through a prior art electroluminescent device as manufactured, or fresh, showing the random orientation of the phosphor particulates, the ionic current path being shown in dotted lines.
Figure 4:
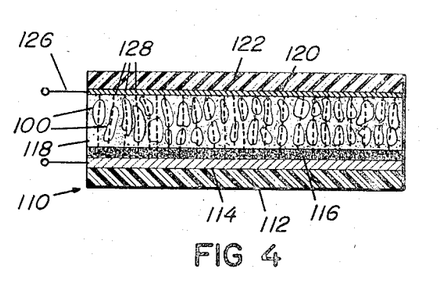
FIGURE 4 is a view similar to FIGURE 3 through a prior art device after minimal usage showing parallelism in orientation of the phosphor grains.

With reference to FIGURES 3 and 4, a conventional prior art electroluminescent layered type device is shown generally at 110 as including a rear insulating layer 112, which may be moisture and vapor-proof as well, a conductive rear electrode layer 114, a rear dielectric layer 116, a layer comprising phosphor particles 100 in a dielectric matrix 118, a front conductive electrode layer 120 and a front translucent or transparent insulating layer 122. The rear and front electrode layers, 114, 120, respectively are electrically connected to conductors 124, 126 in operative association with a source of alternating current to impress an electric field across the phosphor-containing layer thereby causing an ionic current flow between the electrode layers such as shown by the dotted lines 128. It is to be understood that this form of prior art construction will function in the manner indicated whatever the particular materials utilized for the dielectric, the electrically conductive electrodes, etc. The stress developed by the ionic current flow will rotate the phosphor particles 100 within their dielectric matrix 118 from the random dispersion as shown in FIGURE 3 which is the arrangement they take as manufactured or in a fresh electroluminescent device, to align the same with their longest dimension substantially perpendicular to the electrode layers since this is the path of least resistance to the ionic current flow 128, the orientation realized after minimal usage being seen in FIGURE 4. Such a reorientation or realignment of the phosphor particles will be effected even if the dielectric matrix 118 is in the form of a substantially rigid thermo-setting material such as an epoxy resin or the like, and will be even more prevalent with the more conventional organic dielectric matrix commercially utilized in most instances. The rearrangement of the phosphor particles 100 seen in FIGURE 4 after minimal usage of the electroluminescent device 110 will act to present the points of light 104 to the front face of the device as seen in FIGURE 2. Such a result obviously substantially decreases the efficiency of the device as a light source.

Figure 5:
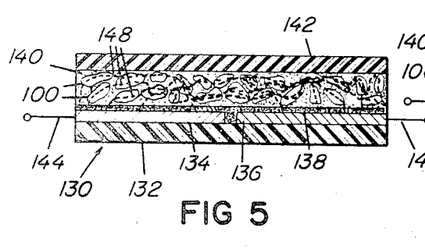
FIGURE 5 is an enlarged detailed cross-sectional view through an electroluminescent device according to a preferred embodiment of this invention, the random orientation of the phosphor particles prior to usage being seen therein.
Figure 6:
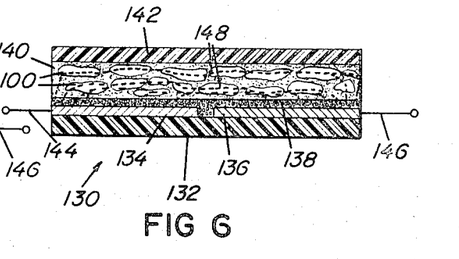
FIGURE 6 is a view similar to FIGURE 5 showing the orientation of the phosphor grains after usage of a device according to this embodiment.

Now comparing the prior art electroluminescent device with a preferred embodiment of the instant invention, reference is made to FIGURES 5 and 6 wherein the device is generally indicated by the reference numeral 130 and will be seen to comprise a rear insulating layer 132, a pair of coplanar, spaced rear electrodes, 134, 136, a rear dielectric layer 138, a layer of phosphor particles 100 carried by a dielectric matrix 140 and a front insulating layer 142. The split electrodes 134, 136 are connected to electrical conductors 144, 146 respectively which are in operative association with a source of alternate current to impress an electric field across the phosphor-containing layer thereby setting up ionic current flow as seen by the dotted lines 148. Once again, the phosphor particles 100 will be randomly dispersed in the dielectric matrix 140 as manufactured or in a fresh condition in the manner of FIGURE 5. However, after minimal usage, the phosphor particles 100 will be oriented utilizing the device of the instant invention in the manner of FIGURE 6 since the ionic current flow 148 tends toward paths extending substantially parallel to the split electrodes 134, 136. By this construction the lines of light 102 of the phosphor particles 100 will be presented to the front face of the device 130 from which the light is to emanate in the manner of FIGURE 1. Such a modified reorientation of the phosphor particles instead of substantially decreasing the efficiency of the light output of the device as in the electroluminescent articles known heretofore, will substantially increase the efficiency during the orientation period. This then illustrates one of the basic improvements which the instant invention affords to electroluminescent devices.

With regard to the specific constituent materials preferred for use in the device of FIGURES 5 and 6 the following detailed description should be considered. The rear and front covering layers 132 and 142 can be of any desired electrically insulating material and if light is to emanate through both faces of the device, both these materials should be translucent or transparent. Additionally, if certain protective precautions are not taken according to optimum embodiments to be described in more detail hereinafter, each of these insulating layers should be both moisture-proof and vapor-proof to protect the phosphor particles against deterioration which would render them ineffective during operation of the electroluminescent device. Mylar (polyethylene terephthalate) and Saran (vinylidene chloride) are particularly satisfactory materials for use as such coverings although other obvious insulating layers can be readily substituted therefor.

In certain instances a light output from one face only of the electroluminescent device, what will be generally designated as the "front" face, is needed and under such circumstances the rear covering material is preferably reflective, or alternately, a reflective covering is applied to the exterior face of the rear covering. The important factor in this regard is that any light emitted by one of the phosphor particles to the rear of the device is immediately redirected forwardly upon hitting the reflective layer.

The electrically conductive split electrodes 134, 136, presuming the light is to be emitted only from the front face of the electroluminescent device, need not be transparent or translucent and therefore its composition can be determined basically with respect to improved electrical conductivity characteristics both from the standpoint of efficiency and cost. In perhaps its simplest form the two portions of the rear electrodes can be formed of a metallic paint such as silver paint or the like merely brushed or sprayed onto the rear covering layer. Alternately, silicon carbide crystals or small glass spheres to which an electrically conductive coating has been applied may be used, each of which is disclosed in more detail in my earlier application entitled, "Electroluminescent Devices and Methods of Making the Same," Ser. No. 354,512, referred to hereinabove. These forms of conductive materials are particularly useful if it is necessary that the electrode layer be translucent or transparent in order to allow emission of light through both faces of the electroluminescent device. For a further explanation of the manner of making or using either of these forms of electrically conductive materials, reference may be had to my earlier application.

The dielectric layer 138 may be formed from cyano ethyl sucrose, particularly if the layer is to be translucent. However, since generally this is not a necesary characteristic of the same, it is preferred to provide the rear dielectric layer 138 with better dielectric properties and possibly with reflective properties, if desired. To achieve reflective properties and good dielectric characteristics is somewhat easier than to achieve translucent and/or transparent properties and good dielectric characteristics. Thus, this dielectric layer is preferably formed of titanium dioxide although barium titanite can be used. Various methods for depositing such dielectric layers will also be found in my earlier application Ser. No. 354,512.

Figure 7:
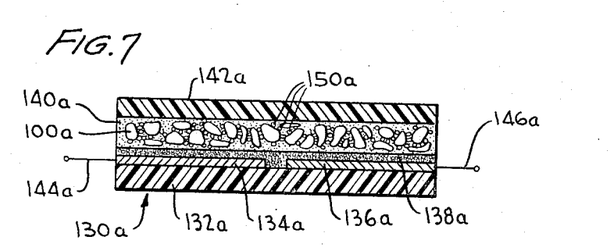
FIGURE 7 is an enlarged detailed cross-sectional view through a device similar to the one shown in FIGURE 5 wherein electrically conductive particles are integrally intermixed with the phosphor grains in the dielectric matrix.

The phosphor-containing layer of the preferred embodiment of this device, as pointed out hereinabove includes the phosphor particles 100 carried by a dielectric matrix 140. Since this dielectric material must be translucent or transparent for optimum efficiency, the material chosen is preferably the cyno ethyl sucrose. In addition to the phosphor particles, this layer includes dielectric material and electrically conductive material. The electrically conductive material may take various forms, two such embodiments being shown in FIGURES 7 and 8 wherein parts similar to the construction shown in FIGURES 5 and 6 have like reference characters followed by the suffix *a* and *b*, respectively. As illustrated in FIGURE 7, discrete conductive particles 150*a* are uniformly intermixed with the phosphor particles 100*a* in the dielectric matrix 140*a*. These electrically conductive particles may be silicon carbide crystals, the conductively coated small glass spheres, commonly referred to as helispheres or microspheres, indium, silver coated copper, finely divided silver powder, finely divided copper powder, or other electrically conductive powder which has a minimal particle size of the same order as the glass spheres. Methods for intermixing and applying this phosphor-containing layer will also be found in detail in my earlier application Ser. No. 354,512.

Figure 8:
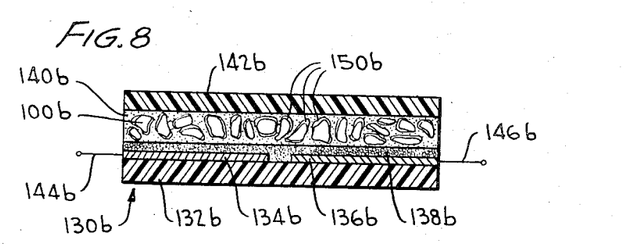
FIGURE 8 is a view similar to FIGURE 7 showing a modified and preferred form of the device wherein the phosphor grains are coated with a substantially monomolecular layer of glass and a partial or discontinuous layer of an electrically conductive material.

The embodiment of FIGURE 8 precludes the necessity of the discrete electrically conductive particles by providing a partially conductive coating on each phosphor particle. As mentioned previously the details of the manner of producing this discontinuous electrically conductive coating designated as 150*b*, can be found in parent application Ser. No. 442,436. An intermediate moisture-proof and vapor-proof coating on the phosphor particles can be provided with methylchlorosilane or colloidal silica, but according to a preferred embodiment of this invention, the phosphor grains are encapsulated in a substantially monomolecular glass coating as described in detail in parent application Ser. No. 442,436. To provide the methylchlorosilane coating, the phosphor particles are bathed in a methylchlorosilane solution and then separated and dried. The coating, when absorbed by the phosphor particles, assumes a polyhydrocarbon nature so as to effectively seal any moisture out of the phosphor particles. Morevoer, the coating material replaces any moisture content in the phosphor particles initially since the phosphor particles have a greater affinity for the methylchlorosilane than for water, i.e., there is a bifunctional condensation. Additionally, the adsorbed methylchlorosilane coating traps free zinc within the peripheral limits of the particles so as to thereby prevent adverse reaction between the free zinc existent in normal operations of the device and the dielectric material. Specifically, the thickness of the coating is a minor fractional part of the mean maximum dimension of the phosphor particles, and in fact, tends to be of the order of one molecule.

It has been found that both moisture and vapor can be responsible for deterioration and/or ineffectiveness of the phosphor particles during operation of an electroluminescent device. With the invention, however, the tendency to encounter any deficiency due to moisture or vapor is substantially reduced, and in fact practically eliminated with a methylchlorosilane coating.

It is to be understood that the concept of providing a thin moisture and vapor impermeable synthetic resin coating on the phosphor particles is broader than the specific methylchlorosilane set forth, although this material has been found to be useful. However, while useful, neither methylchlorosilane nor colloidal silica will function in the admirable manner of a glass coated phosphor particle.

For a more detailed discussion of a further embodiment of the instant inventive concept, reference is now made particularly to FIGURES 9–12, wherein the electroluminescent device is designated generally by the reference numeral 300 and will be seen to include a body portion 310, the device having a pair of opposed major faces 312 and 314. From FIGURE 10, it will be apparent that the faces 312 and 314 are separated by a distance which is only a minor fractional part of the distance between opposed edges of the body 310. In other words, the body 310 is a thin body having the major faces closely spaced, and by comparison, having the edge portions substantially spaced apart. It should be here understood that the important characteristic is not the particular size of the body 310, nor of the spacing between the edges thereof. Instead, the significant factor is that the major faces of the device are close together, compared to two locations, such as the edge portions, where electrodes can be fixed to the body, as explained more fully below.

Figure 9:
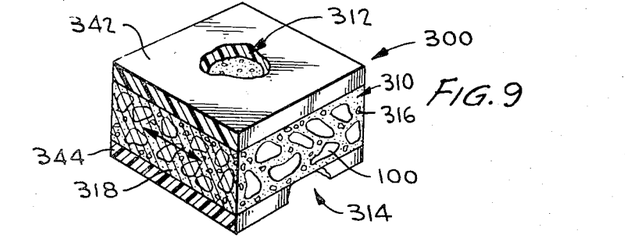
FIGURE 9 is an enlarged fragmentary perspective view of a section of an electroluminescent device constructed in accordance with a further embodiment of the instant inventive concept.

Further, while the body has been shown as having pairs of opposed edges, it is obvious that with a round body a continuous peripheral edge portion can be provided. The particular shape of the body 310 is obviously not critical to the instant inventive concepts.

The body 310 consists essentially of a given volume of dielectric material ($Dv$), a given volume of electroluminescent phosphor particles ($Pv$), and a given volume of electrically conductive material ($Cv$). The dielectric material, phosphor particles and electrically conductive material are randomly dispersed within the body 310 such that there is at least substantial uniformity in heterogeneity of the material and the particles in any cross-section of the body.

In FIGURE 9, and solely by way of example, the phosphor particles 100 are shown as dispersed within the body, the electrically conductive material is shown as dispersed particles 316, and the dielectric material 318 is shown as filling the voids between the phosphor particles 100 and the conductive particles 316.

It is understood that although the conductive material is shown as discrete particles 316 in this embodiment, which particles may be formed of any of the materials discussed hereinabove with regard to the conductive particles 150*a* of FIGURE 7, if desired, and in a preferred modification of this embodiment, the conductive material can actually be in the form of a discontinuous or partial coating of electrically conductive material such as shown at 150b in FIGURE 8 on phosphor particles encapsulated in a substantially monomolecular coating of glass as described hereinabove.

Figure 10:
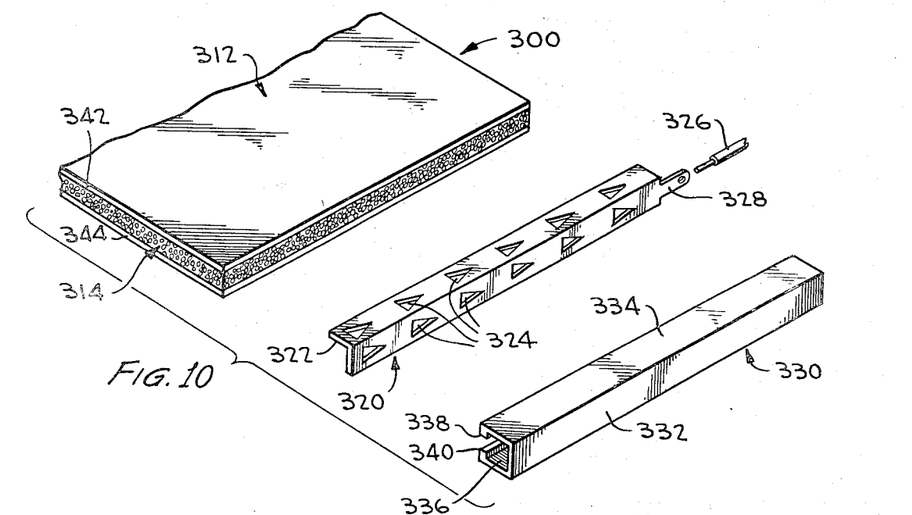
FIGURE 10 is an enlarged fragmentary exploded perspective view of an end portion of an electroluminescent device having a cross-section as shown in FIGURE 9.

While the particular proportions of dielectric material, phosphor particles, and electrically conductive material can be varied within somewhat wide ranges according to this integral embodiment, it is necessary that the composition of the electroluminescent body be balanced more carefully than with the preferred split electrode modification described hereinabove. With the construction shown in FIGURE 9 it is essential that the volume of dielectric material be greater than the volume of phosphor particles, and that the volume of phosphor particles be greater than the volume of conductive material, i.e., $Dv > Pv > Cv$. Once the desired combination of materials has been made, and the body 310 has been formed therefrom, then a pair of electrodes are electrically connected with the body in spaced apart relation to one another. One such electrode is shown in FIGURE 10 and designated by the numeral 320. This electrode includes a right angle member 322 having a plurality of prongs 324 projecting inwardly from the faces thereof. Such electrode includes a suitable electrical connector 326 which, in the ultimate unit, is fixed in conductive relation to the connecting tab 328 extending from the right of the angle member 322 as shown in FIGURE 10. It will be understood that a similar electrode structure (not shown) is connected to an opposed edge portion of the body 310.

Figure 11:
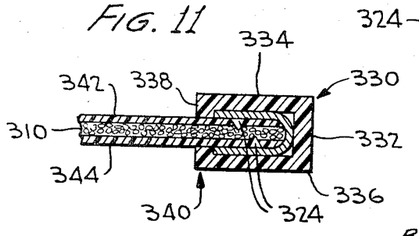
FIGURE 11 is a fragmentary detailed sectional side view showing the components of the embodiment of FIGURE 10, as ultimately assembled.

By referring to FIGURE 11, it will be seen that the prongs 324 project into the body 310, thereby making electrical connection with such body.

In the event that the preferred glass coated phosphor particles are utilized in this embodiment it will not be necessary to protect the same from environmental moisture and vapor. However, if ordinary moisture and vapor sensitive phosphor particles are to be incorporated, then it is desirable that a covering or casing designated generally by the reference numeral 330 in the drawings be utilized. The cover 330 is preferably an elongated hollow tubular body having a rear wall 332, a top wall 334, a bottom wall 336 and a pair of flange projections 338 and 340 which extend inwardly respectively from the top wall 334 and the bottom wall 336 in spaced parallel relation to the rear wall 332.

The flange portions 338 and 340 contact the covering layers 342 and 344 which are disposed on opposite sides of the body 310. Such covering layers are formed of electrically insulating, preferably transparent, but at least translucent sheet stock. If protected particles are not utilized, then these covering layers must also be moisture and vapor proof for optimum results. Once again Mylar and Saran are particularly satisfactory materials for use. If the edge covers 330 are also made of such materials, then an effective solvent seal can be made between the covers 330 and the covering layers 342 and 344 so as to give a vapor-proof and moisture-proof enclosure about the electroluminescent body 310.

In this embodiment, as in the earlier modification, the electroluminescent phosphor particles are of the type commonly used in electroluminescent devices. Moreover, such particles are preferably processed in accordance with conventional techniques, as for example by having a copper sulfate coating and wash to provide activator areas on the particles. As described above, the conventional treated phosphor particles are further preferably processed in accordance with the invention so that the same possess a moisture-proof and vapor-proof coating thereover.

It should be here understood that the present invention is concerned with providing a coating on the phosphor particles, which coating does not require subjecting the particles to any grinding or milling action. In this sense, and consistent with the invention, the coating can accordingly be considered as a deposited coating of minimal thickness. Still further, however, the coating applied in accordance with the invention should be a heat resistive coating, as opposed to merely a moisture-proof depositive coating, and vapor-proof coating per se. In other words, there are certain materials, such as paraffin wax, which are moisture and vapor impermeable, but which cannot satisfactorily withstand the heat inherently generated within an electroluminescent device.

In addition to the phosphor particles, the electroluminescent body of the embodiment, as indicated above, includes a prescribed volume of dielectric material and a prescribed volume of electrically conductive material. The electrically conductive material takes one of the various forms, previously described, preferably the partial coating of stannous oxide on the glass-encapsulated phosphor particles. However, in the broader aspects of this invention, the electrically conductive material may be in the form of individual particles of conductive material. With regard to the conductively coated glass helispheres or microspheres described in my earlier application Ser. No. 354,512 as disclosed therein, these spheres have a mean diameter less than 10 microns. The electrically conductive coating on the surface of the spheres has a thickness which is only a minor fractional part of such diameter up to about 6000 Angstrom units. The coating described in the application may comprise either gold or stannous oxide, although other conductive coatings can be used without departing from the scope and spirit of the invention. While gold is mentioned as useful, it should be understood that this material is not preferred since it provides the spheres with a distinct color rendering the same less efficient as a light source.

Further, it has now been found that ground glass particles as opposed to the spheres mentioned above can be treated in a similar manner and are easier to procure in the desired size, that is, less than 10 microns.

Alternatively, as described in the said earlier application, the electrically conductive particles may consist of clear or colorless silicon carbide crystals. These crystals should have a size of 10 microns or less, (i.e., they should be no larger than approximately 300 mesh). There is some advantage provided by such crystals, primarily because they are not only highly conductive, but also, they possess electroluminescent characteristics themselves. The light output from these crystals thus augments the light output from the primary light source (i.e., the phosphor particles) in an ultimate unit.

Although the conductively coated glass particles and silicon carbide crystals are useful, as well as the indium, silver coated copper, finely divided silver powder, finely divided copper powder or other such electrically conductive powders having a minimum particle size on the same order as the glass spheres, are described since they are useful, none of these materials provide the optimum characteristics of the partial electrically conductive stannous oxide coating on the glass-encapsulated phosphor particles which are preferred.

The dielectric material for this embodiment should also be transparent for maximum light output from the electroluminescent device. Moreover, the dielectric material should possess as high a dielectric strength as possible, consistent with as high a dielectric constant as possible. To this end, it has been found that the cyano ethyl sucrose mentioned with regard to the earlier modification of the device is a particularly satisfactory dielectric material. However, for either embodiment of this invention, it will be realized that there are other dielectric materials which can be used, including by way of example, cellulose acetate butyrate, polypropylene, polystyrene, polyvinyl chloride, vinylidene chloride, and polyethylene terephthalate.

Regardless of the particular dielectric material and regardless of the particular conductive material, once the proper selection of these materials has been made, then the phosphor particles, the dielectric material and the electrically conductive material are integrally mixed to obtain a random and substantially uniform mixture of the ingredients. To this end, it has been found desirable to utilize a cyano ethyl sucrose solution containing a solvent therefor, and to place the other materials into such solution for the mixing operation since the fluid mixture tends to eliminate any possibility of bruising the phosphor particles.

After the mixture has been formed, then the formal product, in sheet form, can be obtained by a plastic casting technique, by spray coating, or by roller coating with ultimate evaporation of the solvent, in any instance. Still further, with the use of a solvent, the mixture and solvent can be sprayed on a supporting surface, such as a wall, ceiling, or the like and the solvent then permitted to evaporate whereby the electroluminescent body provided hereby is deposited in the location of its ultimate use. Alternatively, an extrusion technique, free of the use of any solvent can be used to form the final product as sheet stock. Here the solvent would not be used for the initial mixing. Instead, the ingredients are mixed initially and fed to a hopper for subsequent forming. Where cyano ethyl sucrose is used as the dielectric material, suitable modifiers would be included therewith (e.g., epoxy resins and ethyl cellulose) to plasticize the same and give it bonding properties. Regardless of the manner in which the ultimate electroluminescent body is made, the same consists of an integral body wherein the various component parts are fixed in position either due to their own adhesive properties, or due to the adhesive properties between the particular material and any bonding agent which is used.

The ultimate body as formed, and regardless of the technique by which is is formed, is covered with at least a front insulating covering layer 342, such as shown in the drawings. If the body is formed on a wall or ceiling, only the front layer may be required. On the other hand, if the body is formed of sheet stock which is to ultimately be sized, cut and shaped, then providing the rear covering layer 344 is particularly desirable.

Figure 12:
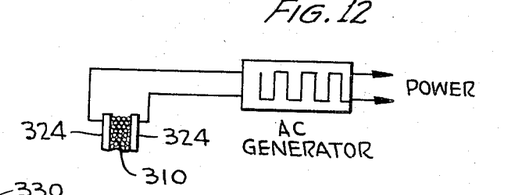
FIGURE 12 is a schematic circuit diagram showing the manner in which an electric field is applied to the device shown in FIGURES 9–11.

After formation, the material can be easily cut, shaped, fixed to supporting structures and the like. Thereafter, the electrodes are attached as indicated, and the edges are sealed so that the interior is maintained free of intruding moisture and vapor, if necessary. The device is then ready for use and when an alternating electrical signal, preferably in the audio frequency range, is applied to the device with sufficient voltage as shown in FIGURE 12, the desired light output immediately results.

With respect to the composition used in the electroluminescent body of this embodiment, it has been stated above that the volume of dielectric material should be greater than the volume of phosphor particles, and in turn, the volume of phosphor particles should be greater than the volume of electrically conductive material. In this latter regard, tests have indicated that the dielectric material should comprise at least 50 percent by volume of the electroluminescent body. On the other hand, the phosphor particles can comprise between 10 to 40 percent by volume of the electroluminescent body, and the electrically conductive material between 5 and 35 percent by volume of such body.

Figure 13:
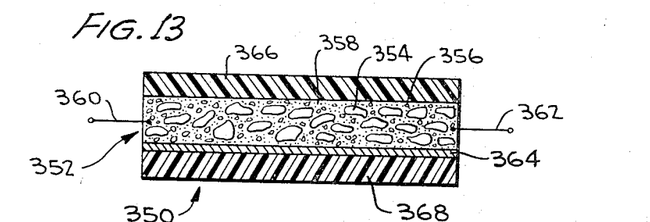
FIGURE 13 is an enlarged fragmentary detailed cross-sectional view through a modified edge-electrode electroluminescent device according to this invention having a voltage-spreading conductive layer on the rear of the phosphor-containing layer.

Referring now to FIGURE 13, a still further modification of the edge-electrode electroluminescent device of this invention is designated generally by the reference numeral 350 and comprises basically a layer 352 containing phosphor particles 354 and conductive particles 356 in a dielectric matrix 358. This layer is exactly the same as in the embodiment of FIGURES 9–12 and can be modified in the manners described hereinabove with respect to such earlier embodiment. The layer 352 is electrically connected at spaced locations as shown schematically by the leads 360, 362.

The embodiment of FIGURE 13, however, differs from the earlier embodiment in having a layer 364 of conductive material on the rear of the phosphor-containing layer 352. This conductive layer may be formed in any manner such as by roller coating, spraying or electro-deposition and may be of any electrically conductive material such as silver, stannous oxide or the like.

It is to be noted that the layer 364 is not directly connected to an electrical source, but rather merely functions as a voltage-spreading means to preclude any non-uniformity in output resulting from non-uniformity in the heterogeneity of the mixture in the layer 352.

Mosture-proof and vapor-proof insulating coverings 366, 368 may be utilized if desired.

To further illustrate the instant invention, and more particularly the embodiments of FIGURES 9–13, the following illustrative examples are set forth. The preferred embodiment set forth hereinabove has less criticality as to composition and it is therefore not believed necessary to illustrate the same by way of detailed examples. It will be understood of course that many of the processing steps and materials described in the examples are equally applicable to both modifications.

*Example 1*

By volume, 10 parts of cyano ethyl sucrose, as heated to be sufficiently fluid to readily mix with other materials, were mixed with 1 part by volume of glass spheres having a conductive gold coating thereon with a thickness of between 4000 and 6000 A. Further, 4 parts by volume of electroluminescent phosphor particles having been coated and washed with copper sulfate by standard techniques were mixed with the electrically conductive particles and the cyano ethyl sucrose. The above ingredients were then placed in a container having a solution of 1 part polyvinyl chloride to 25 parts toluene. The solution, even with the dispersed materials added thereto, was completely fluid and further mixing was performed. Such solution was then placed on a conventional plastic casting drum and the solvent was evaporated with rotation and heating of the drum. The final sheet stock as formed on the drum was then removed and covered on opposite faces with sheets of Saran. Copper electrodes conforming with that shown in FIGURE 12 were then attached to opposite edges of the final sheet structure, and a 120 volt, 2000 c.p.s. signal, was applied across the electrodes. The product was found to produce a relatively intense light output with apparent uniformity in light production across the surface.

*Example 2*

Replacement of the gold coated glass spheres with stannous oxide coated particles improved the product by avoiding the color supplied by the gold material. Further, the gold coating was found to be more easily damaged than stannous oxide.

*Example 3*

Further modification of the EXAMPLE 1 procedure by substituting glass-coated, partially stannous oxide coated phosphor grains further improved the final product by increasing its light output and rendering the same insensitive to moisture and vapor deterioration.

*Example 4*

This example followed EXAMPLE 1, but instead of using Saran coating sheets over the formed electroluminescent body, Mylar sheets having a Saran coating on one face thereof were used. The results were identical.

*Example 5*

The procedure of example 1 was again followed, but in this instance, by volume, 5 parts of cyano ethyl sucrose were used, and 1 part of electrically conductive material was used. The combination of these materials was mixed in the polyvinyl chloride solvent solution, and the example was otherwise followed. The results achieved with this example were generally the same as those achieved with EXAMPLE 1. However, it appeared that the light output was somewhat reduced.

Example 6

The procedure of Example 1 was followed, however, the electroluminescent phosphor particles were initially coated with methylchlorosilane. The thickness of the coating was of the order of 1 molecule. After coating the phosphor particles, the same procedure as set forth in Example 1 was followed. The same results as achieved with Example 1 were found to exist, but with the additional advantage that this product could be subjected to atmospheres with high moisture content and high vapor content without evidencing any significant deterioration.

Example 7

The procedure of Example 1 was followed, but the coated glass spheres were replaced by silicon carbide crystals of approximately 10 microns. The light output of the product was increased, but otherwise, the operation was essentially the same.

Example 8

The process of Example 7 was followed, but the polyvinylchloride was eliminated and replaced by an equivalent amount of an equal mixture of cellulose acetate and catalyzed Epon, a product of Shell Oil Company. The ultimate product proved to be more uniform and slightly brighter than the product of Example 1.

Example 9

The process of Example 8 was followed, but with the phosphor particles having a methylchlorosilane coating of approximately 1 molecule thickness thereon. This product was more moisture resistant than the others.

Example 10

Following the process of Example 1, and adding a layer of conductive material such as shown in FIGURE 13 improves the uniformity of light output particularly when the phosphor-containing layer is not a perfectly heterogeneous mixture.

The above examples serve to illustrate the manner in which the invention can be carried out, the manner in which the mixtures can be made, and the results which can be achieved with the invention. In other examples, the proportions were varied merely within the above-stated limits, and the materials were selected from those listed above. In each instance, the results were found to be satisfactory.

It is to be noted that with the devices of the invention, according to either embodiment, the electrical field is established between substantially spaced locations on the ultimate body and the light exits from the body in a general direction perpendicular to the axis of such field. This is in sharp contrast to prior devices where the light exits generally parallel to the axis of the electrical field. In essence, with the present invention, edge electrodes or a split rear electrode are used, as opposed to facing front and rear electrodes. This characteristic eliminates many of the problems encountered with prior devices, as should be apparent, and completely does away with the requirement for a transparent front electrode which is a troublesome necessity in a prior art so-called "layered" structure. Only when conductive material is included in the phospho-containing layer can such an arrangement be made useful for the production of very large electroluminescent devices.

As mentioned above while a full and clear disclosure is presented herein, in a number of instances, a detailed explanation of certain of the various processing techniques for making the conductively coated glass spheres and for mixing and forming various layers in the preferred embodiment is not repeated since the same is readily available from my copending application Ser. No. 354,512 and in the various parent applications which are incorporated herein by reference.

Having now described the invention in substantial detail, it should be apparent to those reading this description that the objects set forth at the outset of this specification have been successfully achieved.

What is claimed is:

1. An electroluminescent device comprising a layer of electroluminescent phosphor particles and electrically conductive material carried in a dielectric matrix, said electrically conductive material being highly conductive independent of any light incident thereon and generally being spaced from said phosphor particles, means for impressing an electric field across said layer to excite said phosphor particles and produce light therefrom, a major portion of said light emanating from said device in a particular direction through a major face of said device, said means impressing said electric field across said layer providing an ionic current flow passing in a direction generally perpendicular to said direction in which said major portion of said light emanates from said device.

2. An electroluminescent device as defined in claim 1 including a substantially planar front face with said light emanating substantially perpendicularly therefrom, said electric field being impressed across said phosphor-containing layer to provide an ionic current flow passing in a direction generally parallel to said front face.

3. An electroluminescent device as defined in claim 2 including a pair of substantially coplanar, spaced electrodes to the rear of said phosphor-containing layer, and a dielectric layer interposed between said electrodes and said phosphor-containing layer, said means impressing said electric field being operatively connected to said electrodes.

4. An electroluminescent device as defined in claim 3 further including an insulating layer on the rear of said electrodes and an insulating layer on the front of said phosphor-containing layer.

5. An electroluminescent device as defined in claim 4 wherein the spacing between said electrodes exceeds 0.020 inch.

6. An electroluminescent device as defined in claim 1 wherein said phosphor-containing layer has a pair of opposed front and rear faces extending between pairs of opposed edges, said light emanating substantially perpendicularly from at least said front face, a pair of electrodes disposed at one pair of said opposed edges, and said means for impressing an electric field being operatively connected to said electrodes.

7. An electroluminescent device as defined in claim 6 further including an electrically conductive layer on the rear of said phosphor-containing layer.

8. An electroluminescent device as defined in claim 1 wherein said phosphor particles are encapsulated in a moisture-proof and vapor-proof coating, the thickness of said coating on each of said phosphor particles being a minor fraction of the average minimum dimension of said phosphor particle.

9. An electroluminescent device as defined in claim 8 wherein said coating is formed of a material selected from the group consisting of glass, methylchlorosilane and colloidal silica.

10. An electroluminescent device as defined in claim 9 wherein said coating is formed of glass.

11. An electroluminescent device as defined in claim 10 wherein said electrically conductive material is in the form of a discontinuous layer on each glass-coated phosphor particle.

12. An electroluminescent device as defined in claim 11 wherein said electrically conductive material is stannous oxide.

13. An electroluminescent device comprising an electrically activatable luminescent body and a pair of electrodes fixed to said body at spaced locations thereon, said body having a pair of closely spaced major faces and said locations being spaced apart a distance which is substantially greater than the spacing between said faces, said body emitting light through at least one major face thereof in a direction perpendicular to the axis of an activating electric field applied across said electrodes, means for applying said electric field across said electrodes, said body consisting essentially of a mixture of dielectric material, electroluminescent phosphor particles, and an electrically conductive material, said dielectric material being translucent.

14. In an electroluminescent device having a multitude of phosphor particles dispersed throughout a body of dielectric material, the improvement which comprises means for distributing an applied electrical field throughout said body, said means comprising a multitude of electrically conductive means which are highly conductive independently of any light incident thereon, said electrically conductive means being at least substantially uniformly dispersed throughout said body and generally spaced from said phosphor particles, said electrically conductive means being present in an amount by volume which is less than the amount of said phosphor particles.

15. The improvement defined in claim 14 wherein each of said electrically conductive means comprises a discontinuous layer on the individual phosphor particles.

16. The improvement defined in claim 15 wherein said discontinuous layer is in the form of stannous oxide and each of said phosphor particles is encapsulated in a glass coating beneath the discontinuous stannous oxide layer.

17. The improvement defined in claim 14 wherein each of said electrically conductive means comprises a glass particle having a minimum dimension of less than 10 microns and having an electrically conductive coating thereon which has a thickness that is only a minor fractional part of said minimum dimension.

18. The improvement defined in claim 17 wherein said coating is formed of a material selected from the group consisting of stannous oxide and gold.

19. The improvement defined in claim 18 wherein said coating is formed of stannous oxide.

20. The improvement defined in claim 14 wherein said electrically conductive means are silicon carbide crystals.

21. An electroluminescent device comprising a front insulating translucent covering, a rear insulating covering, an electroluminescent body having dielectric material, electroluminescent phosphor particles, and electrically conductive material heterogeneously and randomly dispersed therein free of any layer orientation, sandwiched between, and in direct contact with, said front and rear coverings, and a pair of electrodes connected to said body at spaced locations thereon.

22. An electroluminescent device as defined in claim 21 wherein said front and rear coverings are moisture-proof and vapor-proof.

23. An electroluminescent device as defined in claim 21 wherein said body further includes a bonding agent.

24. An electroluminescent device comprising a front insulating translucent covering, a rear insulating covering, an electroluminescent body sandwiched between said front and rear coverings, and a pair of electrodes connected to said body at spaced locations thereon, said body having dielectric material, electroluminescent phosphor particles, and electrically conductive material heterogeneously and randomly dispersed therein free of any layer orientation, said electroluminescent body having a pair of opposed major faces defining therebetween a peripheral edge, and said electrodes being disposed at spaced locations along said edge.

25. An electroluminescent device comprising:
(a) a body having a pair of opposed faces separated by a maximum distance which is only a minor fractional part of the distance between a given pair of spaced locations on said body;
(b) said body consisting essentially of a volume $Dv$ of dielectric material, a volume $Pv$ of electroluminescent phosphor particles, and a volume $Cv$ of electrically conductive material;
(c) said dielectric material, phosphor particles and electrically conductive material being randomly dispersed within said body such that there is at least substantially uniformity in heterogeneity of material and particles in any cross-section of said body;
(d) said volume being so related that $Dv > Pv > Cv$; and,
(e) a pair of electrodes electrically connected with said body respectively at said given pair of locations.

26. An electroluminescent device as defined in claim 25 wherein said dielectric material consists essentially of cyano ethyl sucrose, and wherein said electrically conductive material consists essentially of a material selected from the class consisting of silicon carbide crystals and glass spheres having a conductive coating on the surface thereof.

27. An electroluminescent device as defined in claim 25 wherein, by volume, said electroluminescent phosphor particles are present in an amount between 1 and 4 parts, and said electrically conductive material is present in an amount between .5 and 3.5 parts, for each 10 parts of dielectric material.

28. An electroluminescent device as defined in claim 25 wherein said electroluminescent phosphor particles have a moisture-proof and vapor-proof coating thereon.

29. An electroluminescent device as defined in claim 25 wherein each of said electrodes comprises an elongate member having a plurality of prongs projecting therefrom and extending within said body.

30. An electroluminescent device as defined in claim 25 wherein said body further includes a bonding agent.

31. In combination, an electroluminescent device having opposed major faces and a peripheral edge portion, a pair of electrodes comprising an electrically conductive elongate metal member having a plurality of prongs projecting from the surface thereof and extending into said device, said electrodes being spaced from each other along said peripheral edge portion.

References Cited
UNITED STATES PATENTS

| | | | |
|---|---|---|---|
| 2,881,344 | 4/1959 | Michlin | 313—108 |
| 2,951,169 | 8/1960 | Faria et al. | 313—108 |

JAMES W. LAWRENCE, *Primary Examiner.*
R. L. JUDD, *Assistant Examiner.*